No. 673,072. Patented Apr. 30, 1901.
D. M. BLISS.
TELEPHONE METER.
(Application filed Oct. 1, 1900.)
(No Model.)
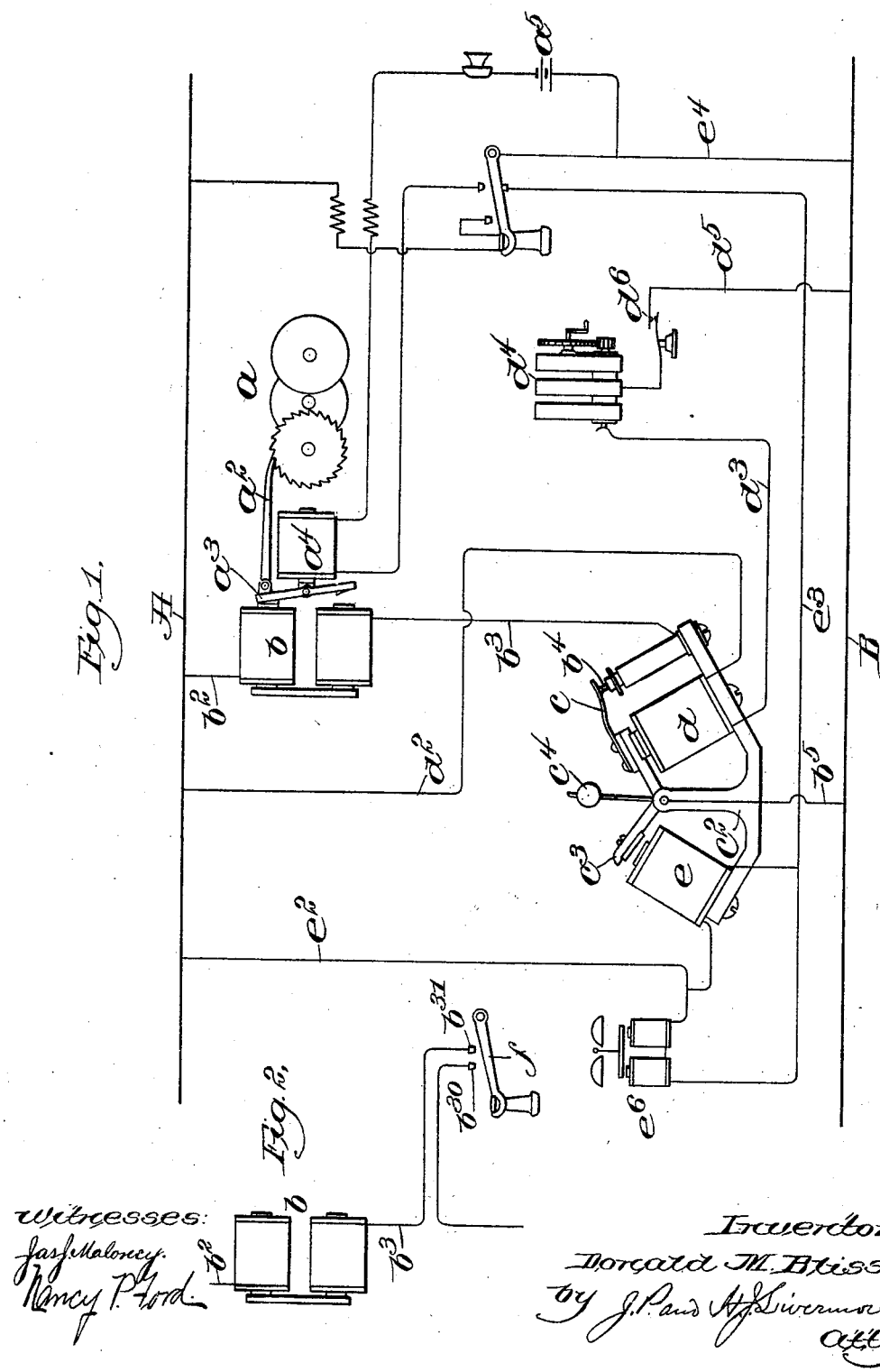
Witnesses:
Jas. J. Maloney.
Nancy P. Ford.
Inventor,
Donald M. Bliss.
by J. P. and A. J. Livermore
Att'ys.

UNITED STATES PATENT OFFICE.

DONALD M. BLISS, OF LOWELL, MASSACHUSETTS, ASSIGNOR TO THE AUTOMATIC TELEPHONE METER COMPANY, OF ORANGE, NEW JERSEY.

TELEPHONE-METER.

SPECIFICATION forming part of Letters Patent No. 673,072, dated April 30, 1901.

Application filed October 1, 1900. Serial No. 31,662. (No model.)

*To all whom it may concern:*

Be it known that I, DONALD M. BLISS, of Lowell, county of Middlesex, and State of Massachusetts, have invented an Improvement in Telephone-Meters, of which the following description, in connection with the accompanying drawings, is a specification, like letters on the drawings representing like parts.

The present invention relates to a telephone-meter or instrument for recording at the telephone itself the extent of use of said telephone.

The meter or registering device may be of any suitable or usual kind and is operated in any suitable way, preferably by electric currents from a source located at the central office.

The present invention relates, mainly, to what may be termed the "meter-controlling devices," which are arranged, in accordance with the invention, so that the meter is placed in condition to operate only when a signal is sent from the instrument where the meter is located, the meter being prevented from operation at any instrument where a signal has been received. Each subscriber, therefore, will have recorded at his instrument the number of times or length of time he has used his instrument at his own volition, there being no record of the time he has used his instrument when called by other subscribers.

In accordance with this invention the meter-controlling device is arranged to be operated in response to the operation of the signaling devices, the sending of a signal from the instrument resulting in such operation of the controlling device that the meter is placed in condition to act, while the receiving of a signal at any instrument results in such an operation of the controller that the meter cannot act.

As herein shown, the meter is adapted to be operated electrically, as by electromagnets located in an electric circuit, the meter thus being readily controlled by opening or closing the said circuit, it being obvious that when the circuit is open the meter cannot operate. The controller, therefore, may be a circuit-closer arranged to be operated to open the meter-circuit when a signal is received and to close the meter-circuit when a signal is sent. As herein shown, the said circuit-controller is arranged to be electrically operated, being under the influence of two electromagnets, one of which is located in the circuit of the current which produces incoming signals and the other being located in the circuit of the current generated to produce outgoing signals.

A further feature of the invention consists in secondarily controlling the meter-circuit by the gravity-hook or its equivalent, so that even after a signal is sent out and the controlling device operated the meter cannot operate unless the receiver is taken down.

Figure 1 is a diagram illustrating the invention, and Fig. 2 a detail showing a modification.

For convenience the devices embodying the invention are shown as applied to an instrument having the ordinary magneto-generator for signaling purposes, it being understood, however, that the invention may be equally well applied to the central energy or other signaling system.

The meter $a$, which is conventionally shown as a train of wheels, may be operated by means of a pawl $a^2$, connected with an armature $a^3$, under the influence of an electromagnet $b$, contained in the meter-circuit which is connected with the line, the meter in this case being operated by a slow alternating or pulsating current superimposed upon the line, in accordance with the method described in a prior application filed by me November 7, 1899, Serial No. 738,470. When this method is used, the inaudible alternating current is superimposed on the line after two instruments are connected and while the instruments are in use, the devices embodying the present invention controlling the meter-circuits, so that only one meter (the one at the calling-subscriber's station) is affected. It is not, however, essential that this method should be employed, as any source of energy which can be controlled by the devices embodying the invention may be used. The armature $a^3$ is arranged to be polarized, so as to vibrate in response to alternating currents, the said armature being pivoted to the core of an electromagnet $a^4$, arranged to be energized by the local battery $a^5$, as will be hereinafter described.

The meter-operating circuit which contains the electromagnet $b$ comprises a conductor $b^2$, leading from one conductor A of the main line through said electromagnet, and a conductor $b^3$, having a terminal $b^4$, which is arranged to be connected, by means of a switch $c$, with a conductor $b^5$, leading to the other wire B of the main line. The meter-circuit, therefore, is only completed when the switch $c$ is in position to connect the said terminal $b^4$ with the conductor $b^5$ and when closed is bridged across the line, so that currents passing over the line will pass through this circuit. The meter-circuit, moreover, is independent of all the other circuits at the instrument where it is located. To control the meter, therefore, it is only necessary to provide the switch $c$ with operating means responsive to the signaling-currents to open or close the said switch in response to incoming or outgoing signals, respectively, and to maintain it opened or closed, as the case may be, during the use of the telephone. As herein shown, the said switch is pivotally supported upon a frame $c^2$ and consists of a rocker-arm $c^3$, which is under the influence of two electromagnets $d$ and $e$, one of which causes the said rocker to move in one direction and the other of which causes the said rocker to move in the opposite direction. The said rocker is arranged to remain in either position when uninfluenced by the electromagnets, being shown as provided with a weight $c^4$, adapted to cross the center of gravity each time the rocker moves. The electromagnet $d$ has a greater number of ampere-turns than electromagnet $e$ and is contained in a circuit consisting of a conductor $d^2$, leading from the main line A, a conductor $d^3$, leading from the electromagnet to one terminal of the generator $d^4$, and a conductor $d^5$, leading from the other terminal of said generator, through the usual switch $d^6$, to the conductor B. When, therefore, a signal is sent from the instrument by operating the magneto $d^4$, the electromagnet $d$ becomes energized, causing the rocker $c^3$ to move to the position shown, thereby closing the meter-circuit, which will remain closed after the current has left the magnet $d$, owing to the weight $c^4$ or equivalent device. A portion of the current from the magneto is also free to pass through the magnet $e$, which, however, has fewer ampere-turns than the magnet $d$ and is overpowered thereby, causing the meter-circuit to be closed.

The electromagnet $e$, which is arranged to move the rocker $c^3$ into such position as to break the meter-circuit, is included in a branch of a circuit $e^2\,e^3\,e^4$, extending from the main wire A to the main wire B and including the call-bell $e^6$. When, therefore, a current is sent from the central office to ring the said call-bell, the electromagnet $e$ will become energized, throwing the rocker $c^3$ in the direction opposite to that shown and breaking the meter-circuit. The circuit through the magnet $d$ is always broken at the switch except when the magneto $d^4$ is in use, so that none of the incoming signaling-current will pass through the magnet $d$ to resist the attracting energy of the magnet $e$. It will be seen, therefore, that the meter-controlling device is so arranged that the meter can operate only after a signal has been sent from the instrument and cannot possibly operate after a signal has been received.

In order to prevent the operation of the meter except when the telephone is actually in use, it is desirable to control the meter also by the gravity-hook or equivalent device so that the meter cannot operate unless the receiver has been taken down.

As has been stated, if a pulsating or alternating current is used to operate the meter the armature $a^3$ must be polarized, and when the local battery $a^5$ is utilized for polarizing the magnet it is obvious that the magnet will only be polarized when the receiver is off the hook, since the local battery is cut out when the receiver is on the hook. The same result may be obtained, however, as indicated in Fig. 2, by including in the meter-circuit switch-terminals $b^{30}\,b^{31}$, which are adapted to be bridged by the gravity-hook $f$, so that the meter-circuit can only be completed when the controlling device has been properly operated and the receiver has been lifted from the hook. While this feature is not essential to the present invention, it effectually prevents any accidental operation of the meter after the receiver is hung up if the meter-current should be left on the line by the operator at the central office, and it also adapts the device for use on party lines where the signaling-current passes through a number of instruments on one line.

It is not intended to limit the invention to the specific construction and arrangement herein shown, since modifications may obviously be made without departing from the invention.

I claim—

1. A telephone-meter located at the telephone instrument and provided with operating mechanism; a controlling-circuit for said operating mechanism; and a circuit-controller for said circuit operating in response to the operation of the signaling devices, said circuit-controller being selectively influenced by incoming and outgoing signals respectively and adapted to remain in either position until again acted upon, substantially as described.

2. A telephone-meter located at the telephone instrument; a circuit for current to operate said meter; a circuit-controller for said circuit adapted to operate in response to the operation of the signal-sending device at the instrument where the meter is located to close said circuit and to operate in response to the current which operates the signal-receiving device at the said instrument to break said circuit, said controller remaining in either position until again influenced, as set forth.

3. A telephone-meter located at the instrument; a circuit for current to operate the meter; a circuit-controller adapted to be operated by the signaling-currents to close the said circuit in response to the outgoing signaling-current and to open the said circuit in response to the incoming signaling-current, said controller remaining in either position until again operated; and means controlled by the gravity-hook or its equivalent for preventing the operation of the meter except when the receiver is in use, as set forth.

4. In a telephone-meter located at the ininstrument; a circuit containg electromagnets to operate the said meter, said circuit being bridged across the line conductors and independent of the other circuits at the instrument; means for closing said circuit in response to the outgoing signaling-currents; and means for breaking said circuit in response to the incoming signaling-currents, substantially as described.

In testimony whereof I have signed my name to this specification in the presence of two subscribing witnesses.

DONALD M. BLISS.

Witnesses:
    NANCY P. FORD,
    HENRY J. LIVERMORE.